May 18, 1965 R. B. DOME 3,184,547

VERTICAL SYNC SEPARATOR CIRCUIT KEYED AT TWICE THE HORIZONTAL LINE RATE

Filed Nov. 30, 1962 2 Sheets-Sheet 1

INVENTOR:
ROBERT B. DOME,

BY Frank J. Thompson
HIS ATTORNEY.

INVENTOR:
ROBERT B. DOME,
BY Frank J. Thompson
HIS ATTORNEY.

United States Patent Office 3,184,547
Patented May 18, 1965

3,184,547
VERTICAL SYNC SEPARATOR CIRCUIT KEYED AT TWICE THE HORIZONTAL LINE RATE

Robert B. Dome, Geddes Township, Onondaga County, N.Y., assignor to General Electric Company, a corporation of New York Filed Nov. 30, 1962, Ser. No. 241,302
6 Claims. (Cl. 178—69.5)

Figures 1, 2:
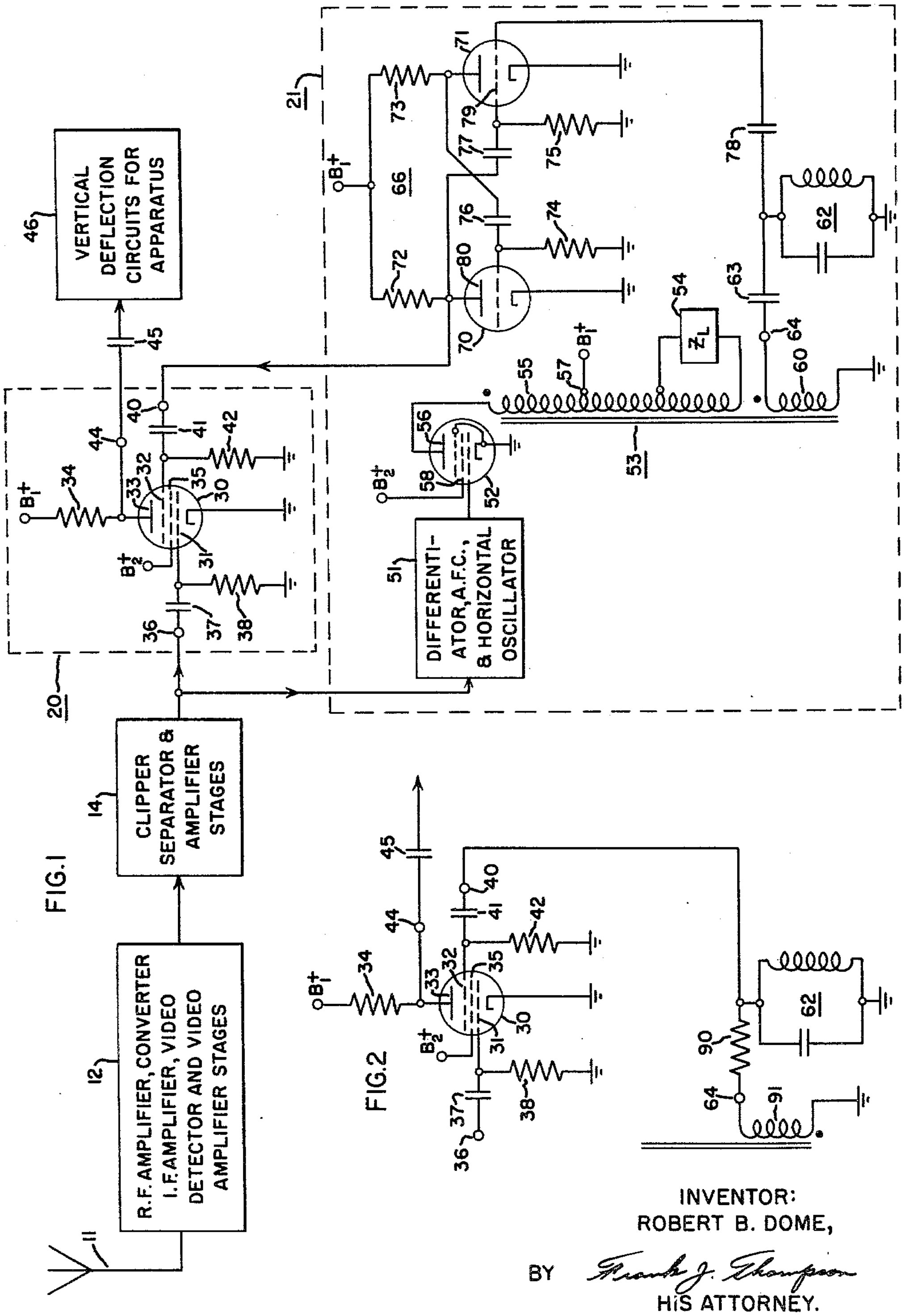

This invention relates to circuit arrangements in television receiving apparatus for separating a vertical synchronizing signal component from a composite television synchronizing signal. The invention relates more particularly to a separator circuit arrangement for providing a separated vertical synchronizing signal component having a waveform with a leading edge of relatively short duration.

Present-day television receiving apparatus generally includes a clipper stage for separating a composite synchronizing signal from a composite video signal. The separated composite synchronizing signal having a waveform including vertical synchronizing, horizontal synchronizing, and equalizing components is subsequently coupled to one or more stages of integrating circuits for providing separation of the vertical synchronizing signal component from the composite waveform. The separated vertical synchronizing signal generally has a waveform characterized by a leading edge of relatively long duration which is typically on the order of 200 microseconds.

Although this separated vertical synchronizing signal waveform is adequate for providing proper synchronization of a vertical sweep generator in many kinds of television receiving apparatus, the relatively long rise time of the leading edge renders the separated waveform unsuitable for providing a greater precision in vertical synchronization required by a television receiving apparatus of the type described Patent No. 2,813,146 which is assigned to the assignee of the present invention. In providing the greater precision in vertical synchronization, it is desirable that the duration of the leading edge of the vertical synchronizing waveform be considerably less than a value attainable by the aforementioned integrating circuit arrangement.

Accordingly, it is an object of the present invention to provide an improved circuit arrangement for separating vertical synchronizing signal components from a composite synchronizing signal.

Another object of the present invention is to provide a circuit arrangement for separating from a composite synchronizing signal, a vertical synchronizing signal component having a waveform with a leading edge of relatively short duration.

In accordance with the present invention, a vertical synchronizing signal separator circuit arrangement for a television receiving apparatus is provided comprising a source of a composite synchronizing signal having horizontal synchronizing, vertical synchronizing, and equalizing components, a source of a blanking signal, a blanking circuit arrangement having input and output terminals, and means coupling the composite synchronizing signal and blanking signal to input terminals of the blanking circuit. The blanking signal source generates a signal having a waveform which is suitable for causing an output signal from the blanking circuit during the occurrence of the vertical synchronizing signal and for inhibiting an output signal during the occurrence of the horizontal synchronizing and equalizing components.

Figure 3:
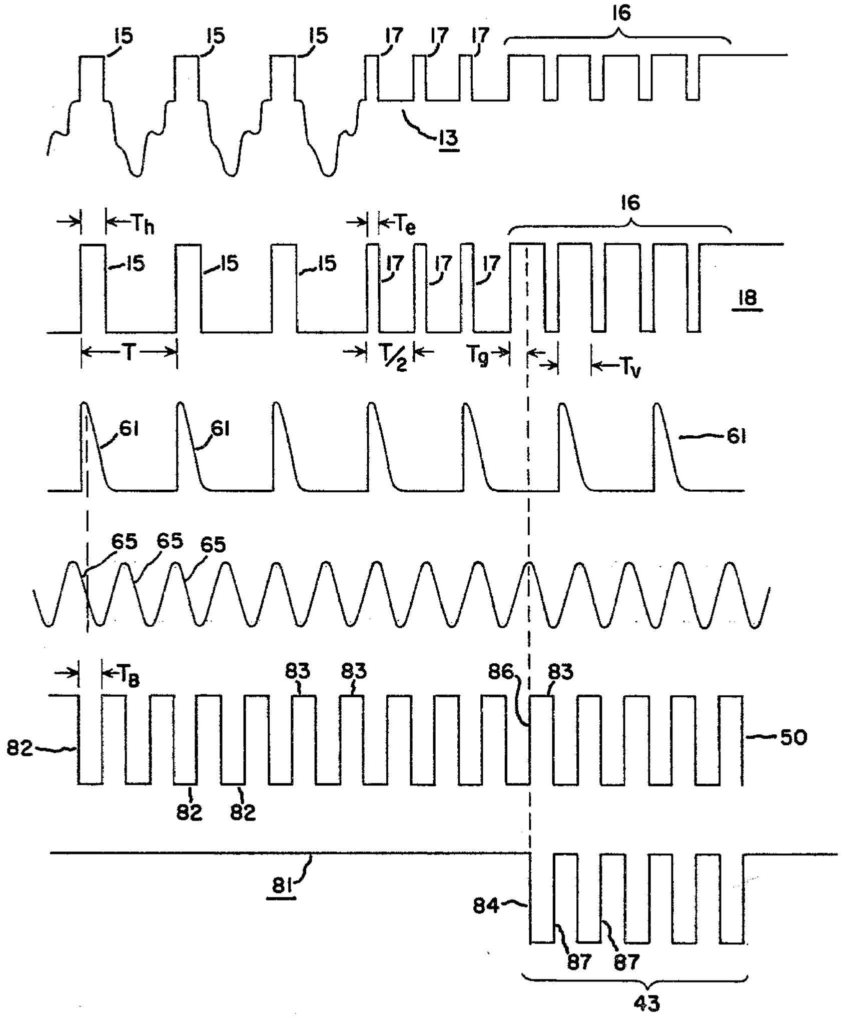

Further objects, features and the attending advantages of the invention will be apparent with reference to the following specification and drawings in which:

FIGURE 1 is a circuit diagram, partly in block form, of a circuit utilizing one embodiment of the present invention, FIGURE 2 is a circuit diagram illustrating an alternative embodiment of the present invention, and FIGURE 3 is a diagram of various pertinent waveforms existing in the circuit arrangement of FIGURES 1 and 2.

For a detailed description and explanation of one embodiment of the present invention, reference is now made to FIGURES 1 and 3. Only those portions of a television receiving apparatus are illustrated in FIGURE 1 which are necessary for an understanding of the invention. The television receiving apparatus includes an antenna 11 and radio frequency amplifier, converter, intermediate-frequency amplifier, video detector, and video amplifier stages indicated generally by a block 12. A detected and amplified composite video signal 13, illustrated in FIGURE 3, is provided as an output signal from the video amplifier stage of block 12 and is coupled to a separator stage 14 wherein recurring horizontal synchronizing, vertical synchronizing, and equalizing components 15, 16, and 17 respectively, illustrated in FIGURE 3, are separated from the composite video signal 13 and appear as recurring components of a composite synchronizing signal 18.

In accordance with a feature of this invention, circuit means are provided for separating the vertical synchronizing component 16 from the composite synchronizing signal 18. These means comprise a blanking circuit shown within the dotted lines in FIGURE 1 and indicated generally as 20, a source of a blanking signal including a horizontal beam-deflection system for the apparatus shown within the dotted lines and indicated generally as 21, and means coupling the composite synchronizing signal and blanking signal to the blanking circuit.

The blanking circuit 20 of FIGURE 1 includes a pentode electron discharge amplifying device 30 having input control and suppressor electrodes 31 and 32 respectively. A D.C. operating voltage is supplied to an output anode electrode 33 via a resistive load impedance 34 while a D.C. operating voltage is also supplied to a screen electrode 35. The composite synchronizing signal 18 is coupled from the separator circuit 14 to an input terminal 36 of the blanking circuit and from this input terminal to the input control electrode 31 by a coupling capacitor 37. Bias voltage is provided at the control electrode 31 by an RC circuit combination comprising a grid leak bias resistor 38 and the capacitor 37. A blanking signal of a desired waveform as described hereinafter is coupled from the source 21 to an input terminal 40 of the blanking circuit and to the input suppressor electrode 32 by a coupling capacitor 41. Bias voltage is provided at the suppressor electrode 32 by an RC circuit combination comprising a grid leak resistor 42 and the capacitor 41. The blanking circuit 20 as thus arranged functions as a coincidence circuit for input pulses of positive polarity at the input control and suppressor electrodes to provide a negative going output pulse at the anode electrode 33. As described hereinafter, an inverted vertical synchronizing signal component 43, illustrated in FIGURE 3, is separated from the composite synchronizing signal 18 by the blanking circuit 20 and is coupled from an output terminal 44 by a coupling capacitor 45 to a utility circuit which comprises the vertical deflection circuits for the television receiving apparatus and is indicated generally by the block 46.

The source 21 of blanking signal illustrated in FIGURE 1 includes a horizontal beam deflection system for the receiving apparatus, a wave selecting network, and a wave shaping network. The beam deflection system comprises a conventional horizontal synchronizing signal separator circuit, automatic frequency control and horizontal sweep waveform generator which are indicated generally by the block 51, a horizontal output amplifying device 52 and a horizontal output transformer 53. An output load circuit 54 is coupled to a winding 55 of the transformer. Direct current operating voltage is supplied to an anode electrode 56 of the amplifying device 52 via a tap 57 and a portion of the winding 55. Direct current operating voltage is also supplied to a screen electrode 58 of the amplifying device. The deflection system is conventional in operation and provides a sawtooth deflection waveform at the load circuit 54 for deflecting an electron beam in the receiving apparatus at a horizontal scanning frequency, $f_h$, of 15.750 kc.

The transformer 53 includes an additional winding 60 across which electrical pulses 61, illustrated in FIGURE 3, are periodically generated at the horizontal scanning frequency during the occurrence of a flyback segment of the sawtooth waveform. The horizontal synchronizing components 15 and the flyback segments are coincident in time and the pulses 61 are therefore suitable, when of the proper polarity, for providing a blanking pulse or for timing a blanking pulse for blanking the horizontal components 15 in the blanking circuit 20. However, the equalizing componets 17 occur at a rate equal to twice the frequency $f_h$ of the horizontal synchronizing components. A blanking waveform having pulse components occurring at a rate of $2f_h$ must be provided for blanking these equalizing components.

For providing a blanking pulse having this desired waveform a wave selecting tuned circuit 62 is provided and tuned to a frequency $f_e$ where $$f_e=2f_h$$

A capacitor 63 couples the pulses 61 from an output terminal of the winding 60 to the tuned circuit 62. A second harmonic voltage component 65 of the pulses 61 having a frequency $f_e$ is thus developed across the tuned circuit 62.

A free running multivibrator circuit 66 for generating a rectangular blanking waveform 50 is provided and is arranged in a conventional manner. The multivibrator includes triode electron discharge amplifying devices 70 and 71, anode electrode load resistors 72 and 73, and RC coupling networks including resistors 74 and 75 and capacitors 76 and 77. The second harmonic component of the timing pulses 61 is coupled by a capacitor 78 from the tuned circuit 62 to a control electrode 79 of the amplifying device 71 for timing the multivibrator. An output blanking waveform 50 is coupled from an anode electrode 80 to the input terminal 40 of the blanking circuit 20 for blanking the horizontal and equalizing components and providing an output waveform 81 having a separated and inverted vertical synchronizing component 43 as illustrated in FIGURE 3.

The multivibrator is timed by the second harmonic component 65 of pulse 61 for generating at anode 80 a blanking waveform having a negative going inhibiting pulse component 82 of duration $T_b$ during the occurrence of the horizontal synchronizing and equalizing components. Tuned circuit 62 may be slightly detuned when necessary in order to provide proper phasing between the generated blanking waveform 50 and the synchronizing signal 18. The multivibrator RC circuits are selected for providing a duration $T_b$ which is greater than a duration $T_e$ of the equalizing components and which is equal to or greater than a duration $T_h$ of the horizontal components. Thus, the negative pulses 82 which occur in coincidence with the horizontal synchronizing and equalizing components will maintain the device 30 in plate current cut-off and consequently inhibit any output voltage variation at terminal 44. However, because the duration $T_v$ of the vertical components 16 is substantially greater than the periods $T_h$, an output voltage will occur during the occurrence of a positive going enabling component 83 of the blanking waveform 50 to provide a separated vertical synchronizing component 43. Initiation of the waveform 43 is delayed a period $T_g$ which is a small fraction of the period $T_v$ and typically represents approximately 7 microseconds. The waveform 43 will thus be periodically initiated after the delay and have a leading edge 84 determined by the rise time 86 of the positive going enabling component 83. Thus, a separated vertical synchronizing component is provided having a leading edge with a rise time substantially less than can be provided by the aforementioned integrating circuit arrangements.

In FIGURE 2 an alternative embodiment of the present invention is shown. Only that portion of FIGURE 1 is reproduced in FIGURE 2 which is necessary for a clear understanding of the embodiment of FIGURE 2. The pulses 61 are coupled from a winding 91 on transformer 53 to the tuned circuit 62 by a resistance 90. The winding 91 is equivalent to the winding 60 of FIGURE 1 with the exception that it is wound to provide a negative output pulse rather than a positive output pulse 61 as shown in FIGURE 3. The second harmonic voltage component 65 which is generated across the tuned circuit 62 is coupled from the tank circuit 62 to the input terminal 40 of the blanking circuit 20 without intermediate waveshaping means. A negative alternation of the second harmonic is made coincident in time with the horizontal synchronizing component and thus with the equalizing components of the composite synchronizing signal. By providing a second harmonic component of large amplitude, a separated vertical synchronizing output voltage will simulate the square waveform 50. A smaller amplitude of blanking sinusoidal input at the suppressor electrode 32 will cause the segments 87 of the output waveform 43 to have a trapezoidal form rather than the rectangular form, as shown, or even half wave sinusoids in the event that the sine-wave voltage is very small. However, even when this sine-wave voltage across the tank circuit is small the output wave will be a sinusoid in character at twice the frequency of the horizontal synchronizing components and will have a rise time of one-fourth of the time of one cycle, or a rise time of 8 microseconds. Even in this circumstance, the rise time is advantageously relatively much shorter than the rise time derived by the above referred-to integrating circuits.

While I have illustrated and described and have pointed out in the annexed claims novel features of my invention, it will be understood that various omissions, substitutions and changes in the forms and details of the system illustrated may be made by those skilled in the art without departing from the spirit of the invention and the scope of the claims.

What I claim as new and desire to secure by Letters Patent in the United States is:

1. A television receiving apparatus having means for separating a vertical synchronizing signal from a composite synchronizing signal comprising: a source of a composite synchronizing signal having a waveform including recurring vertical synchronizing, horizontal synchronizing, and equalizing components; a blanking circuit having first and second input terminals and an output terminal; means coupling said composite synchronizing signal to said first input terminal; means providing a blanking signal having a waveform including enabling and inhibiting components, said inhibiting components occurring coincident in time with said horizontal and equalizing components; and means coupling said blanking signal to said second input terminal of said blanking circuit, said blanking circuit being responsive to said composite synchronizing signal and said blanking signal to produce a separated vertical synchronizing signal at said output terminal.

2. The apparatus of claim 1 wherein said means for providing a blanking signal includes a horizontal beam deflection system for the apparatus.

3. A television receiving apparatus having means for separating a vertical synchronizing signal from a composite synchronizing signal comprising: a source of a composite synchronizing signal having a waveform including recurring vertical synchronizing components, horizontal synchronizing components of duration $T_h$, and equalizing components of duration $T_e$; means providing a blanking signal having a waveform including an enabling component and an inhibiting component of duration $T_B$ where:

$$T_B \geqslant T_h$$

and said inhibiting component occurs coincident in time with said horizontal component for the duration $T_h$ and coincident in time with said equalizing component for the duration $T_e$; a blanking circuit having first and second input terminals and an output terminal; means coupling said composite synchronizing signal to said first input terminal and said blanking signal to said second input terminal; said blanking circuit being responsive to said composite synchronizing signal and said banking signal to product an output signal at said output terminal during the simultaneous occurrence of a component of said synchronizing signal and the enabling component of said blanking signal.

4. A television receiving apparatus having means for separating a vertical synchronizing signal from a composite synchronizing signal comprising: a source of a composite synchronizing signal having a waveform including recurring vertical synchronizing components, horizontal synchronizing components having a repetition frequency $f_h$, and equalizing components; a blanking circuit having first and second input terminals and arranged for providing an output signal voltage when input voltages of a same predetermined polarity are coupled to said first and second input terminals respectively; means coupling said composite synchronizing signal from said source to said first input terminal; a horizontal electron beam deflection circuit for said apparatus; said deflection circuit including means for providing an electrical pulse having a repetition frequency equal to the repetition rate $f_h$ of said horizontal synchronizing component; a parallel resonant circuit tuned to a frequency $2f_h$; means for coupling said pulse to said resonant circuit; and means coupling a voltage from said resonant circuit to said second input terminal of said blanking circuit.

5. The apparatus of claim 4 wherein said means for coupling said voltage from said resonant circuit to said blanking circuit second input terminal includes a multivibrator circuit.

6. The apparatus of claim 4 wherein said means for coupling said voltage from said resonant circuit to said second input terminal of said blanking circuit comprises alternating-current coupling means.

References Cited by the Examiner

UNITED STATES PATENTS

| | | | |
|---|---|---|---|
| 2,431,577 | 11/47 | Moore | 178—67.5 |
| 2,497,413 | 2/50 | Lindley | 178—69.5 |
| 2,761,010 | 8/56 | Bridges | 178—7.5 |

DAVID G. REDINBAUGH, *Primary Examiner.*